U

United States Patent [19]

Bronfenbrenner et al.

[11] Patent Number: 4,935,221
[45] Date of Patent: Jun. 19, 1990

[54] WATER CONDENSER/SEPARATOR SYSTEMS FOR CLAUS PROCESSES

[75] Inventors: James C. Bronfenbrenner, Allentown; Michael S. Chen, Zionsville; M. Moniz, Wescosville; Pradip Rao, Allentown, all of Pa.

[73] Assignee: Air Products and Chemicals, Inc., Allentown, Pa.

[21] Appl. No.: 206,061

[22] Filed: Jun. 13, 1988

[51] Int. Cl.$^5$ .................. B01D 43/00; B01D 47/06; C01B 17/02; C01B 17/05
[52] U.S. Cl. .................. 423/574 R; 23/293 S; 55/73; 55/82; 423/574 L; 423/578 R
[58] Field of Search ........... 423/578 R, 574 L, 574 R; 23/293 S; 55/73, 82

[56] References Cited

U.S. PATENT DOCUMENTS

| | | | |
|---|---|---|---|
| 1,955,722 | 4/1934 | Ahlqvist | 423/574 L |
| 2,258,305 | 10/1941 | Stirlen | 423/574 R |
| 2,413,714 | 1/1947 | Keeling | 423/574 R |
| 3,681,024 | 8/1972 | Hujsak et al. | 423/574 R |
| 3,798,316 | 3/1974 | Beavon | 423/574 R |
| 3,812,243 | 5/1974 | Landrum et al. | 423/574 L |
| 3,822,341 | 7/1974 | Smith | 423/574 R |
| 3,911,093 | 10/1975 | Sherif et al. | 423/223 |
| 4,138,473 | 2/1979 | Gleck | 423/574 R |
| 4,158,039 | 6/1979 | Ullrich | 422/262 |
| 4,302,434 | 11/1981 | Hellmer et al. | 423/571 |
| 4,426,369 | 1/1974 | Palm | 423/574 R |
| 4,464,309 | 8/1984 | Linhardt | 261/23 |
| 4,481,181 | 11/1984 | Norman | 423/571 |
| 4,526,590 | 7/1985 | Palm et al. | 55/27 |
| 4,601,330 | 7/1986 | Palm et al. | 165/95 |

FOREIGN PATENT DOCUMENTS

| | | |
|---|---|---|
| 931327 | 8/1973 | Canada ............... 423/574 L |
| 0082579 | 9/1983 | European Pat. Off. . |
| 0234894 | 9/1987 | European Pat. Off. . |
| 3607029A | 10/1986 | Fed. Rep. of Germany . |

OTHER PUBLICATIONS

Perry's Chemical Engineers' Handbook, 5th ed. Perry et al., McGraw-Hill Book Co., 1973, pp. 18-3, 52, 53.

Primary Examiner—Jeffrey E. Russel
Attorney, Agent, or Firm—Geoffrey L. Chase; James C. Simmons; William F. Marsh

[57] ABSTRACT

An apparatus and process are described for the cooling and condensing of sulfur and water vapors from a Claus gas below the sulfur freezing point (248° F.) at low pressure (<30 psia), so that solid sulfur and condensed water are simultaneously removed from the Claus gas without solid sulfur plugging of the separation equipment and with efficient separation of the sulfur from water.

14 Claims, 4 Drawing Sheets

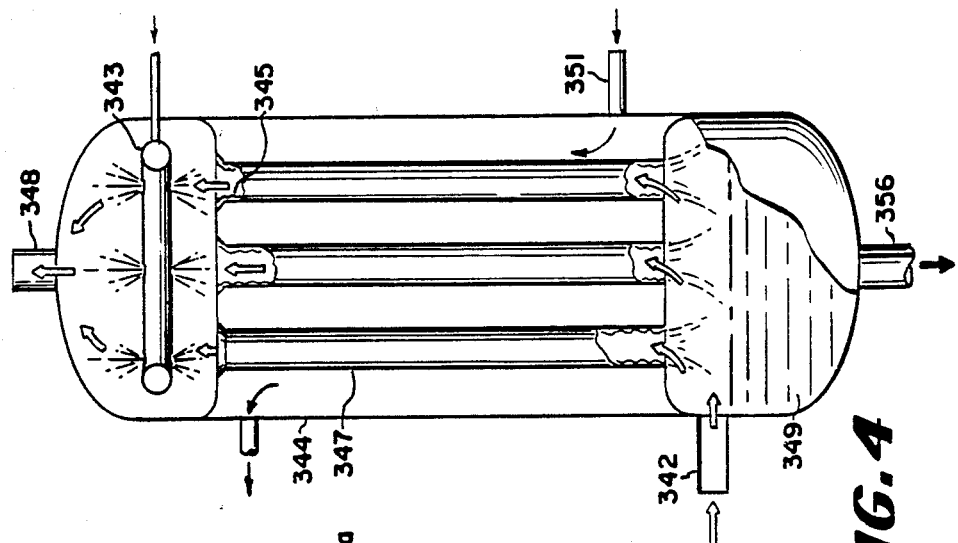
FIG. 4
FIG. 4a
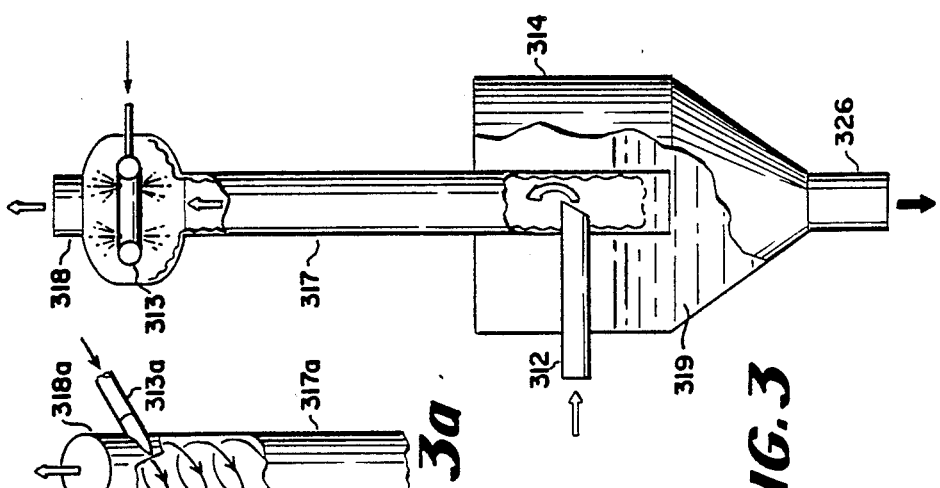
FIG. 3a
FIG. 3

WATER CONDENSER/SEPARATOR SYSTEMS FOR CLAUS PROCESSES

TECHNICAL FIELD

The present invention is directed to an apparatus and process for condensing water and solidifying sulfur from a Claus gas simultaneously. More specifically, the present invention is directed to the simultaneous condensation of water and solidification of sulfur at low pressures while avoiding plugging of process apparatus with solidified sulfur and further for separating sulfur from water.

BACKGROUND OF THE PRIOR ART

The prior art practice in Claus reaction processing has attempted various techniques for recovery of both sulfur and water from a Claus reaction effluent. Typically, sulfur has been recovered independently or in a different stage of processing from water of reaction if the latter is recovered at all. Under operation of high pressures, it is possible, as is known in the prior art, to condense water without solidifying sulfur so as to avoid a sulfur plugging problem. In all of the solid sulfur recovery processes, it is recognized that sulfur plugging of process apparatus is a potential problem. It is recognized by the sulfur processing industry that removal of water of reaction at an intermediate stage in Claus processing will affect improvements in the overall Claus reaction to achieve more complete conversion of hydrogen sulfide to elemental sulfur.

U.S. Pat. No. 2,413,714 is directed to a Claus process, including a combustion furnace 3, wherein a Claus reaction effluent passes through a catalytic reactor 8 and water and liquid sulfur are condensed in a tower 9, subjected to a spray of water through line 16. At column 5, lines 43-45, it is stated that the spray of water is in the form of a "finely divided form and as film on the walls of condenser 9 and reservoir 10". The process is operated at a pressure of at least 20 psi gauge. Final water/sulfur separation is affected in a countercurrent contact tower 11. The patented process attempts to recover solid sulfur simultaneous with the recovery of water of reaction from a Claus gas at a temperature at least above the freezing point of sulfur.

U.S. Pat. No. 3,681,024 discloses a Claus reaction process wherein acid gas, oxygen and recycle gas are combusted in a furnace 2 and further in a catalytic reactor 18 before the Claus reaction effluent is introduced into a countercurrent water tower 26. The effluent is scrubbed to remove sulfur, which forms solid sulfur in the top of the tower 26 proximate to the dispenser 30 and forms a slurry or liquid sulfur at the bottom of the tower 26, proximate to the dispenser 32, depending upon the temperature. The pressure of the system is recited to be in the range of 0 to 50 psig. No teaching is made with regard to the avoidance of sulfur plugging in any area of the tower 26 which is susceptible to solid sulfur formation. In the preferred embodiment, the patented process would not have a sulfur plugging problem at the base of the tower 26 because of the preferred form of the sulfur being in its molten form.

U.S. Pat. No. 3,822,341 is directed to a Claus process in which acid gas is combusted with an oxygen containing gas in waste heat boiler 8 and further reacted in a catalytic reactor 24 before being combined with tail gas and introduced in a separation vessel 44 containing liquid water. Solid sulfur is purportedly deposited on the froth 56 and removed as powdered sulfur in line 60. Water is removed in line 64 and stripped of sulfur dioxide with an oxygen containing gas purge. The desulfurized Claus effluent in line 40 is further reacted in catalytic reactors. Sulfur solidification in dispersion nozzle 52 is not addressed by the patent.

U.S. Pat. No. 4,158,039 discloses an apparatus for separating sulfur from an aqueous sulfur suspension which is heated above the melting point of sulfur through heating coils 20. The sulfur is separated by the action of heat and agitation by a mixing device. Molten sulfur is removed in line 34. This sulfur separation patent does not address the removal of solid sulfur from a Claus gas.

Additional patents in the prior art directed to the field of Claus processing and sulfur recovery of more general interest include U.S. Pat. Nos. 2,258,305, 3,798,316, 4,138,473, 4,302,434, 4,426,369, 4,464,309, 4,481,181, 4,526,590 and 4,601,330. Additionally, the Abstract of German Patent No. DE3607029A discloses separation of sulfur from its dispersion in water and European patent application No. 0 234 894 discloses a Claus process including a water condensation step downstream of the first sulfur condenser.

European patent application No. 0 082 579 teaches a self-regulating process for removal of hydrogen sulfide from gases comprising the absorption of a first part of the hydrogen sulfide from the gas stream in an aqueous solution of sulfur dioxide to form elemental sulfur, separation of the remaining amount of hydrogen sulfide from the gas stream by a conventional absorption system (9), recovery of the hydrogen sulfide from the conventional absorption system, conversion of the recovered hydrogen sulfide to sulfur dioxide and use of the sulfur dioxide to form the aqueous solution of sulfur dioxide used to absorb the first part of the hydrogen sulfide.

U.S. Pat. No. 3,911,093 has a process for recovering sulfur values from gas emissions by absorbing $SO_2$ in an aqueous solution comprising a mixture of $Na_2HPO_4$ and $NaH_2PO_4$ at a pH between about 2.5 and about 5 at an absorption temperature between about 85° and about 200° F., treating the phosphate solution containing absorbed $SO_2$ with $H_2S$ to produce sulfur, separating the sulfur from the phosphate solution and recycling the phosphate solution to the absorber. Provision is made to remove sulfate, which builds up in phosphate absorbent, by crystallizing sulfate from a purge stream. The process is particularly useful in the field of pollution abatement for recovering $SO_2$ from the off-gas obtained from a Claus-type reactor system.

None of the prior art addresses an efficient technique for simultaneous removal of water of reaction and solid sulfur from a Claus gas without sulfur deposition or plugging of process apparatus and the efficient separation of sulfur from water, as is fully achieved by the process and apparatus of the present invention detailed below.

BRIEF SUMMARY OF THE INVENTION

The present invention is directed to an apparatus for recovering solid sulfur and water of reaction from a Claus gas, such that sulfur vapor can be condensed and solidified from said Claus gas without solid sulfur adhering to the surfaces of the apparatus and such that water of the Claus reaction is condensed out at pressures at or below 30 psia, comprising a gas-liquid contact system having a Claus gas inlet, a cooling water inlet, a Claus gas outlet and an aqueous sulfur suspension outlet, and a separation system for separating solid sulfur from water of the aqueous sulfur suspension.

The said gas-liquid contact system may consist of one or more contact stages, each of which has one or more water-film inlet tubes connected to the Claus gas inlet and the cooling water inlet and the Claus gas outlet wherein the cooling water inlet is situated to dispense a spray of water into the said inlet tubes, and the aqueous sulfur suspension is discharged from the other end of the tubes into the bottom zone of the contactor. The inlet tubes may be submerged in the bottom zone wherein additional gas cooling may be effected through submerged cooling elements.

The said separation system consists of a separator vessel for retaining a volume of aqueous sulfur suspension and having an aqueous sulfur suspension inlet in flow communication with the gas-liquid contact system, a hydrogen sulfide sparge gas inlet, a solid sulfur outlet, a sparge gas outlet, and a water outlet. Preferably, the separator has calming baffles between the aqueous sulfur suspension inlet and the H₂S sparging inlet on one side and the solid sulfur outlet on the other side. Preferably, said water outlet of said separator vessel is in flow communication with said water inlet of said contact system. Optionally, the separator vessel has a heating element in external flow communication with a heating source to heat said volume of aqueous sulfur suspension.

The present invention is also directed to a corresponding process for recovering solid sulfur and water of the Claus reaction at or below 30 psia wherein the solidified sulfur does not adhere to process apparatus surfaces, comprising the steps of introducing the Claus gas containing at least water, sulfur, hydrogen sulfide and sulfur dioxide into a gas-liquid contact zone, cooling the gas below the freezing point of sulfur and the dew point of water vapor by introducing cooling water into inlet tubes such that a spray of water directly contacts the gas concurrently or countercurrently with the gas and said water from a film on all interior surfaces of said inlet tubes, by maintaining a volume of aqueous sulfur suspension formed from solidfying sulfur, water and cooling water, separating said aqueous solid sulfur suspension from dehydrated, sulfur-free Claus gas in said contact zone, removing said dehydrated Claus gas and removing said aqueous sulfur suspension from said contact zone.

Preferably, the Claus gas enters the contact zone at a temperature in the range of 250°–450° F.

Preferably, the Claus gas is cooled to a temperature in the range of 90°–170° F. in the first stage and 90°–120° F. in the second stage in a two-stage contact zone. Preferably, these temperatures are below the water dew points of the Claus gas.

The said aqueous sulfur suspension discharged from said contact zone is further separated into a solid sulfur product and a substantially sulfur-free recycle water stream in a separator process, comprising the steps of feeding said aqueous sulfur suspension into an inlet separation zone, sparging a stream of H₂S-containing gas into the aqueous suspension, affecting the settling of solid sulfur from said aqueous suspension and removing said solid sulfur from the bottom of the separator zone while recovering water from the top of said separator zone.

Preferably, a portion of water recovered from the separator zone is cooled and recycled to the gas-liquid contact zone as the latter said cooling water.

Optionally, said water is filtered to remove any residual solids.

Preferably, the separator zone is maintained at a temperature in the range of 120°–250° F. Optionally, the temperature is in the range of 140°–180° F., the same as the temperature of the aqueous sulfur suspension removed from the said gas-liquid contact zone. Optionally, the process can include heating said aqueous sulfur suspension by an outside heating sources.

Preferably, the H₂S sparging zone is separated from solid sulfur settling zone by calming baffles. Preferably, the H₂S sparging gas is derived from a portion of the acid gas feed to the Claus process.

BRIEF DESCRIPTION OF THE DRAWING

FIG. 3 shows a gas-liquid contact apparatus design for gas-liquid countercurrent mode in the falling-film inlet tube.

FIG. 3a shows a partial view of FIG. 3 with an alternative embodiment.

FIG. 4 shows another multi-tube gas-liquid contact apparatus.

FIG. 4a shows a partial view of an alternative to FIG. 4.

DETAILED DESCRIPTION OF THE INVENTION

Figure 1:
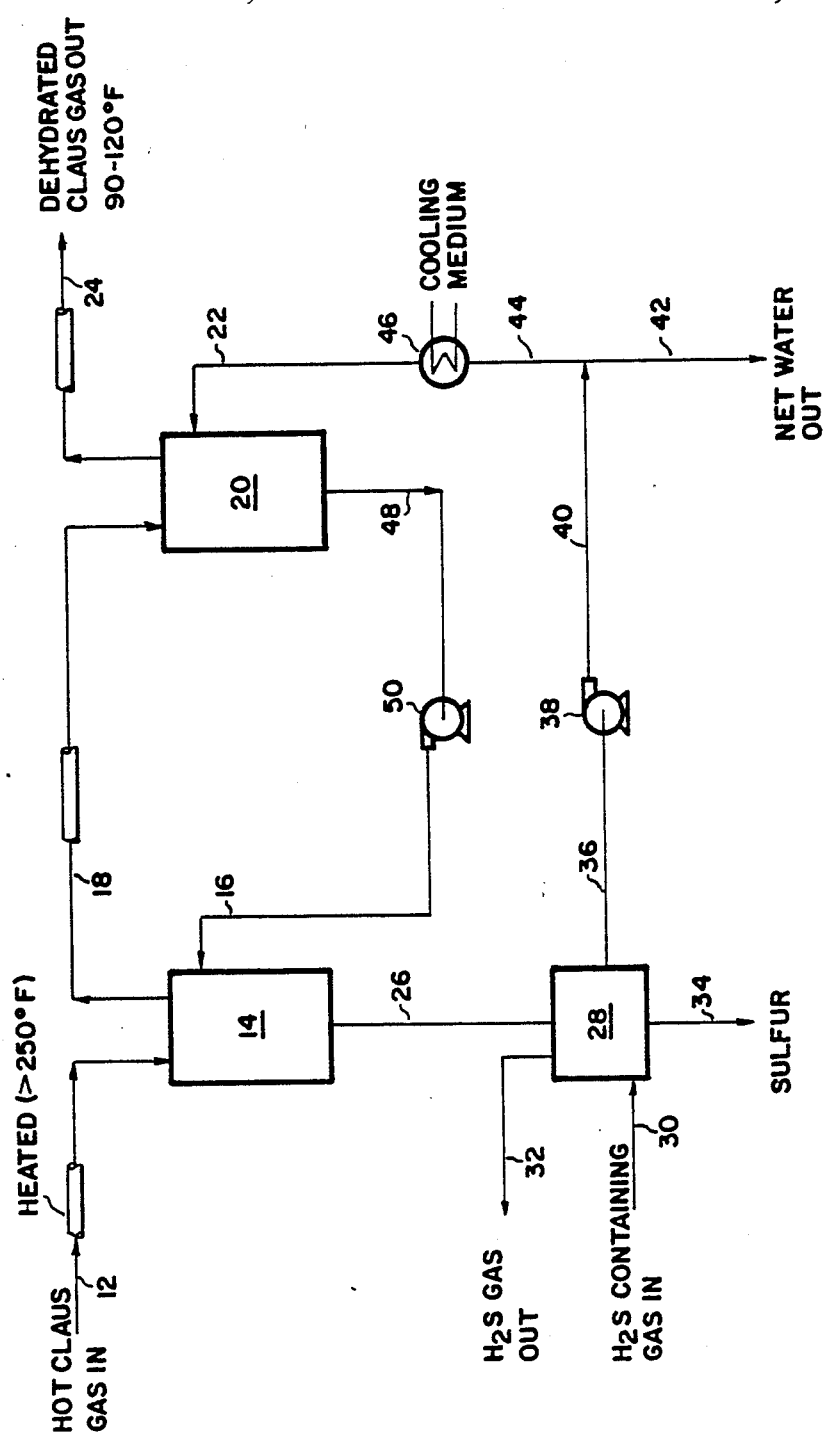
FIG. 1 is a schematic illustration of the preferred embodiment of the present invention showing a two-stage gas-liquid contact system and a separation system for the aqueous sulfur suspension.

It has long been recognized that if water vapor can be condensed out of a Claus gas, the sulfur recovery would be greatly increased because the equilibrium limitation of the Claus reaction is removed.

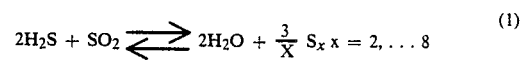

$$2H_2S + SO_2 \rightleftharpoons 2H_2O + \frac{3}{X} S_x \quad x = 2, \ldots 8 \tag{1}$$

Condensing water at temperatures below sulfur freezing point (~248° F.) generally leads to equipment plugging and a stable aqueous sulfur suspension which is very difficult to break and separate. The present invention provides a practical way to solve these two problems.

The first problem is solved by contacting a sulfur laden Claus gas in a completely wetted falling water film inlet tube in a gas-liquid contact system, and cooling and condensing water/sulfur vapors below the sulfur freezing point and below the water dew point (90°–170° F.) such that no sulfur can build up on the walls of the contactor. The inlet water spray not only creates the water film, but also creates a large surface area for cooling and for capturing sulfur particles and promoting sulfur agglomeration.

The second problem is solved by taking the stable aqueous sulfur suspension and contacting it with a H₂S containing gas in combination with heating the aqueous suspension such that solid sulfur can be easily settled out and separated from the water.

The unique apparatus and process of the present invention affects the separation of water of Claus reaction as condensate and sulfur as solid from a Claus process in an efficient operable manner which prevents solid sulfur plugging of the apparatus. It is recognized that when Claus gas containing free sulfur is cooled to condense out water vapor at low pressure (20-30 psia), the sulfur is going through a transition phase from vapor to liquid to solid, and the sulfur is in a rubbery state rendering it extremely sticky for process handling. The moving liquid film in the initial inlet contact tubes precludes solid sulfur from sticking to the surfaces of the apparatus. Once sulfur is solidified, it is no longer sticky. Since the Claus gas also contains $H_2S$ and $SO_2$, further reaction between these two species is also effected in the liquid phase present in the contact system and the separation system.

It is believed that the following reactions occur in the liquid phase present in the aqueous film of the tubes as well as the reservoirs or volumes of aqueous sulfur suspension in the other equipment of the present invention.

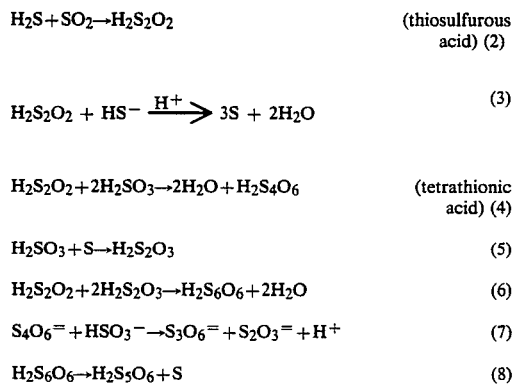

$$H_2S + SO_2 \rightarrow H_2S_2O_2 \quad \text{(thiosulfurous acid)} \quad (2)$$

$$H_2S_2O_2 + HS^- \xrightarrow{H^+} 3S + 2H_2O \quad (3)$$

$$H_2S_2O_2 + 2H_2SO_3 \rightarrow 2H_2O + H_2S_4O_6 \quad \text{(tetrathionic acid)} \quad (4)$$

$$H_2SO_3 + S \rightarrow H_2S_2O_3 \quad (5)$$

$$H_2S_2O_2 + 2H_2S_2O_3 \rightarrow H_2S_6O_6 + 2H_2O \quad (6)$$

$$S_4O_6^= + HSO_3^- \rightarrow S_3O_6^= + S_2O_3^= + H^+ \quad (7)$$

$$H_2S_6O_6 \rightarrow H_2S_5O_6 + S \quad (8)$$

If hydrogen sulfide is in excess, sulfur is the main product, via reaction (3) above. If sulfur dioxide is in excess, tetrathionates are the main products via reactions (2), (4) through (8). These polythionates and other polysulfur oxides tend to form stable solid/liquid suspensions around sulfur particles, which make them sticky and difficult to handle or separate.

By sparging $H_2S$ gas into the aqueous sulfur suspension, the various thionates will react with $H_2S$ to produce elemental sulfur, which can then be easily separated from the water. Furthermore, by heating the suspension, the reaction rates are accelerated to reduce the suspension holding volumes in the system.

Most Claus furnace and catalytic converters are operated at low pressures (20-30 psia) and as a result, water cannot be condensed above the sulfur melting point of approximately 245° F. The failure to remove water limits the overall sulfur recovery to about 95-98% depending on the hydrogen sulfide feed concentration, the number of catalytic converters and the use of air or pure oxygen as the oxidant. This in turn has led to expensive tail gas clean up units that must be installed in tandem to the Claus process equipment in order to increase overall sulfur recovery capabilities to about a 99-99.9% level, which constitutes the current stringent sulfur emission standards in developed regions of the world. The present invention by using a low pressure process and a unique condensation and separation apparatus and procedure allows for recovery of sulfur in Claus operations to the new high limits of sulfur emission standards.

The present invention will now be described in greater detail with reference to a process scheme as shown in FIG. 1. A Claus gas (12) constituting the Claus reaction products from a Claus sulfur condenser comprising at least water and sulfur vapors, $H_2S$ and $SO_2$ at a temperature of 250°-450° F. enters a first stage gas-liquid contactor (14). Substantial water and sulfur vapors are condensed from the gas by contacting it with inlet cooling water (16). The cooled and partially dehydrated gas (18) leaves the first stage at a temperature of 120°-170° F. and is heated to >250° F. before entering a second stage gas-liquid contactor (20). The Claus gas (18) is further cooled to 90°-120° F. and leaves as stream (24) to the down-stream Claus process unit by contacting it with inlet cooling water (22). The aqueous stream (48), leaving the second stage contactor, is used as cooling water for the first stage contactor through a pump (50). The aqueous sulfur suspension (from 0.1-3 wt %) formed in the first stage contactor as stream (26) is directed a solid sulfur/water separator (28). The separator, holding the suspension for about 30 minutes to 3 hours, is sparged with a substantially $SO_2$—free $H_2S$ containing gas (30) at 120°-200° F. and at a rate equivalent to about two times the $SO_2$ absorbed, which leaves the separator in stream (32). The settled solid sulfur (34), 3-40, wt %, is withdrawn from the separator for further downstream sulfur processing, such as melting or purification. The clear water (36) is withdrawn from the separator, pumped (38) via lines 40 and 44 to a cooler (46). A net water (42) from condensation of the Claus gas is separated from the process loop. The remaining cooled recycle water (22) is returned to the second contact stage.

Figure 2B:
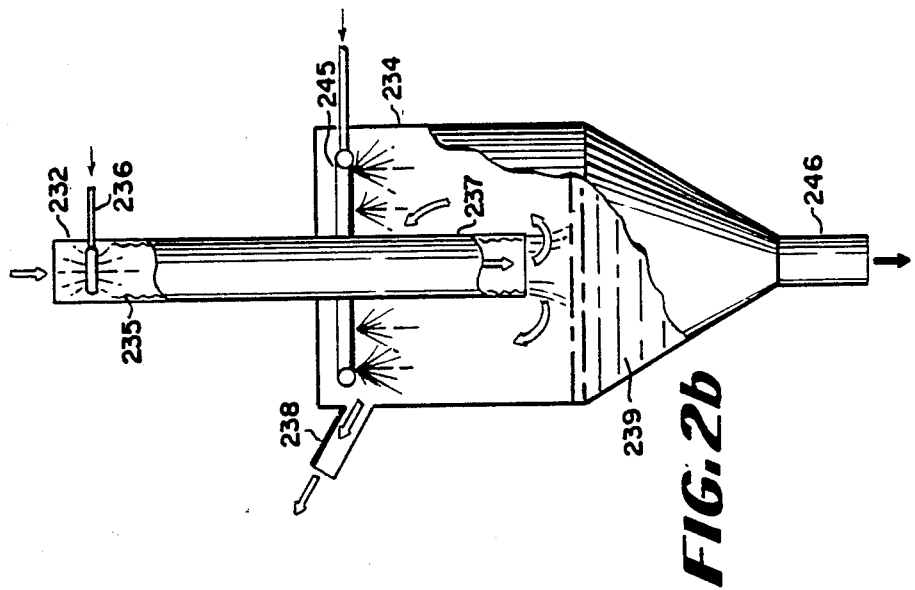
FIG. 2a and 2b show two gas-liquid contact apparatus designs for gas-liquid co-current, down flow mode in the falling-film inlet tubes.
Figure 2A:
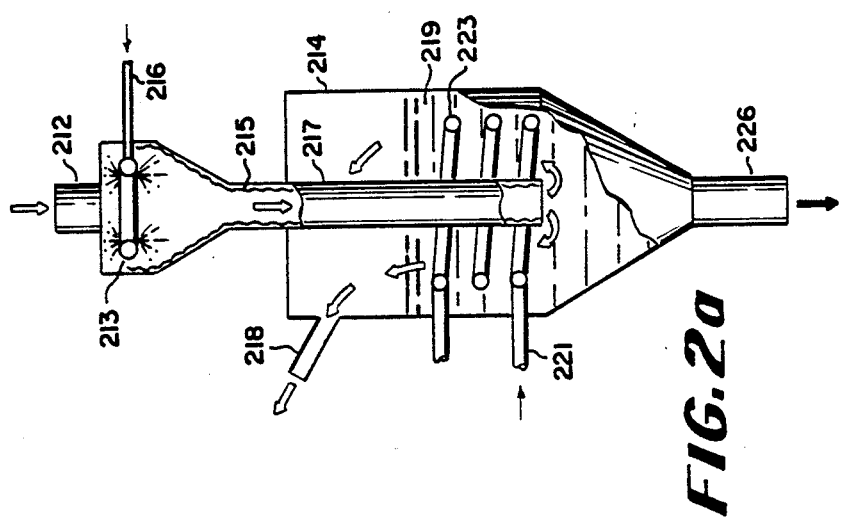

Various designs for gas-liquid contactor apparatus are illustrated in FIG. 2a and 2b. All designs are based on the same basic principle of falling water-film to completely wet the inlet gas-liquid contact and cooling zone. FIG. 2a and 2b illustrate two concurrent downflow modes of contacting. FIG. 2a shows a hot Claus gas enters the gas-liquid contactor (214) through a Claus process gas inlet (212) to a spray nozzle (213) in intimate contact with water spray fed by the cooling water inlet (216). The gas travels down the falling water film inlet tube (217) with water film (215) that fully wets the walls of the tube and discharges into a gas-liquid suspension disengaging zone or chamber (219) having an aqueous sulfur suspension. The submergence of the tube in the suspension in said disengaging zone or chamber provides further gas cooling, condensation and sulfur capture. The tube constitutes an inlet gas-liquid contact zone or chamber. The partially dehydrated Claus gas leaves the contactor as stream (218). The aqueous sulfur suspension is discharged through the bottom of the chamber in an aqueous sulfur suspension outlet (226). The cooling of the suspension can be further effected with cooling coils (223) by cooling water (221). FIG. 2b shows another design for concurrent Claus gas (232) and cooling water (236) contact and cooling in the wetted-wall, falling water-film tube (235), which again constitutes an inlet gas-liquid contact zone or chamber. The mixture is discharged above the aqueous sulfur suspension (239) and the gas leaves the contactor through Claus process gas outlet (238). Additional cooling is effected by water spray (245). The suspension is discharged through the bottom of the chamber in the aqueous sulfur suspension outlet (246). Contactor (234) and tube (237) are similar to contactor (214) and tube (217) of FIG. 2a.

FIG. 3 and 4 illustrate two countercurrent modes of contact cooling. The countercurrent arrangement has the advantage over the concurrent one in that the temperature of aqueous sulfur suspension leaving the contactors is substantially higher than that of inlet water, which is beneficial to the subsequent sulfur/water separation. FIG. 3 shows the hot Claus gas enters the contactor (314) through Claus process gas inlet (312) into the bottom of fully wetted-wall, falling water-film tube (317) which constitutes an inlet gas-liquid contact zone or chamber. The gas travels upward and leaves at the top of the tube in a Claus process gas outlet (318) through a water spray zone (313). The aqueous sulfur mixture is discharged into the aqueous sulfur-water suspension (319) and leaves the bottom of the chamber in the aqueous sulfur suspension outlet (326). FIG. 3a shows a detail of an alternative water injection 313a into tube 317a with a tangential administration causing a spiraling mixing. Gas leaves in outlet 318a. FIG. 4 shows the preferred gas-liquid contact apparatus design of this invention. The hot Claus gas enters the contactor (344) at the bottom of the contactor through Claus process gas inlet (342). The gas is distributed and travels upward through multiple wetted-wall, falling water-film tubes (347) which are completely wetted with water film (345) which again constitute an inlet gas-liquid contact zone or chamber. The dehydrated Claus gas leaves the contactor at the top through Claus process gas outlet (348) above the spray zone (343). The aqueous sulfur suspension is discharged from the bottom of the aqueous sulfur suspension disengaging chamber (349) through aqueous sulfur suspension outlet (356). The multiple tubes can be further cooled by circulating cooling water (351) through the double walled portion of the chamber without diluting the suspension. FIG. 4a shows a partial detail of contactor 344a in which tubes 347a end with a serrated weir 358a to insure complete water-wetting of the internal tube walls.

Figure 5A:
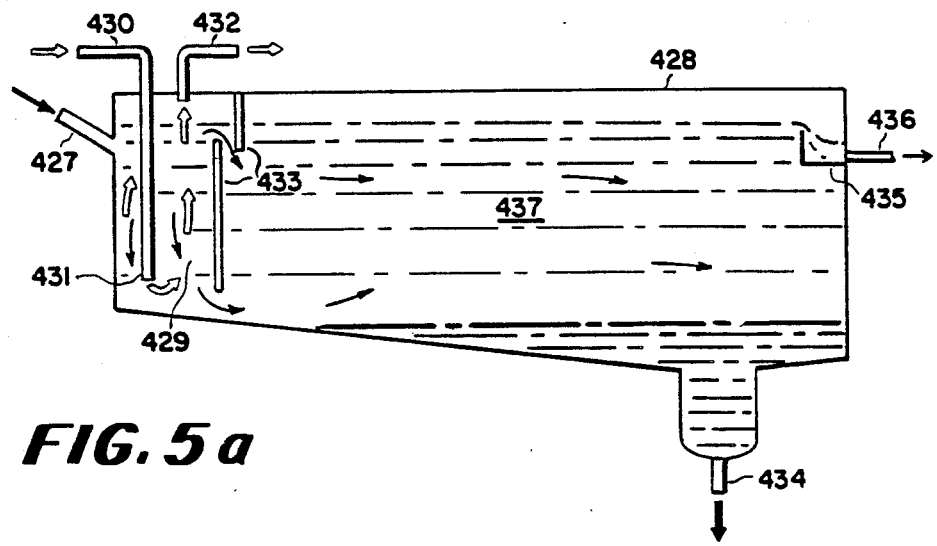
FIG. 5a and 5b show two separation apparatus design for aqueous sulfur suspension.
Figure 5B:
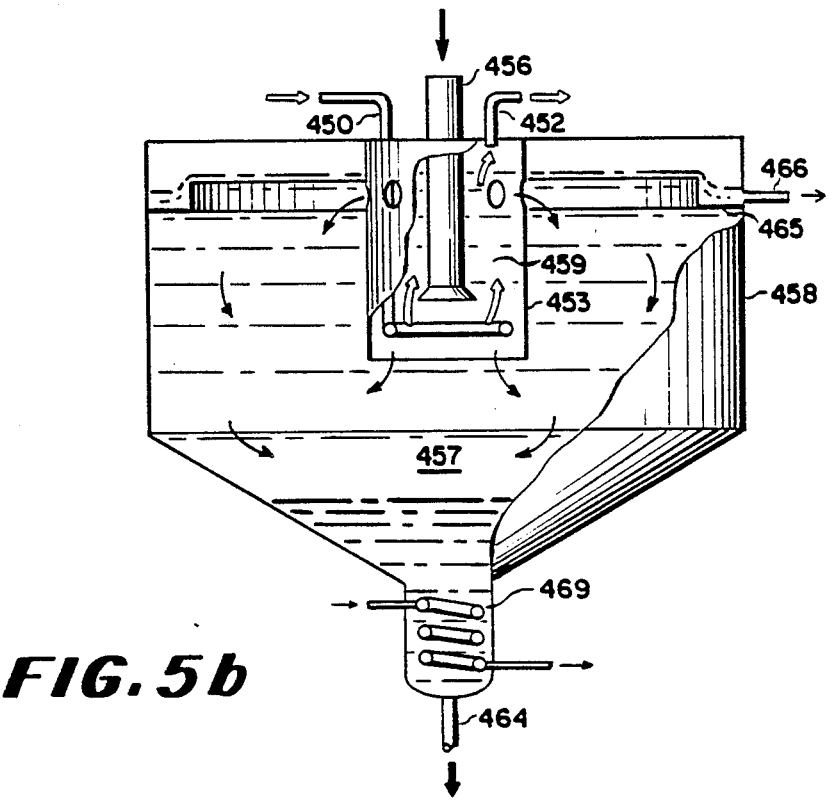

FIG. 5a and 5b illustrate two apparatus designs for sulfur/water separation. FIG. 5a shows the preferred embodiment of the present invention. The aqueous sulfur suspension enters the separator vessel (428) through an aqueous sulfur suspension inlet (427) into an initial contact zone or inlet chamber (429), which is sparged with a $H_2S$ containing gas (430) substantially free of $SO_2$ and $O_2$ through a sparge gas inlet (431). Excess $H_2S$ gas leaves through sparge gas outlet (432). The suspension/$H_2S$ gas contact zone or inlet chamber is preferably separated from the settling zone or calming chamber (437) by calming baffle (433). The suspension leaves the inlet zone through underflow pass to the calming chamber or zone for effecting sulfur/water separation by settling. Concentrated solid sulfur is discharged from the bottom through solid sulfur outlet (434) and the clarified water is withdrawn through an overflow weir (435) and water outlet (436).

FIG. 5b is another separator design. The suspension enters the separator vessel (458) through the center-well, aqueous sulfur suspension inlet (456) into the initial contact zone or inlet chamber (459) which is sparged with $H_2S$-containing gas through sparge gas inlet (450) and sparge gas outlet (452) pipes. The suspension flows through holes in the calming baffle (453) into the settling zone or calming chamber (457). The settled solid sulfur is discharged from the bottom through heating zone (469) and solid sulfur outlet (464). The clarified clear water is withdrawn through overflow weir (465) and water outlet (466).

The basic principles of the present invention are demonstrated in the following examples:

EXAMPLE #1

Wet and Dry Surfaces for Sulfur Condensation

In Run #1, a hot nitrogen gas was passed through a molten sulfur bath at about 350° F. and fed to the top of a venturi contactor, similar to FIG. 2a setup. The throat gas velocity was about 49 ft/sec. A water spray was not used. The sulfur vapor-loaded $N_2$ stream was cooled off through natural heat loss while passing through a glass made venturi system. Solid sulfur was condensed on the dry surfaces in the inlet chamber, venturi, as well as the bottom gas/liquid disengaging reservoir and outlet line of the contactor. In about 30 minutes, the surfaces were completely coated with solid sulfur. In Run #2, the same experiment was repeated except that a water spray was turned on (0.15 gal/ACF) to wet the inlet contact chamber and the venturi throat. Sulfur condensation occurred only at dry surfaces of the downstream divergent section of the venturi and the reservoir. The run was terminated in about 70 minutes. Run #3 was similar to and continued from Run #2, except the gas flow rate was doubled. The throat gas velocity was about 100 ft/sec and water rate was about 0.088 gal/ACF; sulfur condensation occurred initially on the non uniformly wetted surfaces as in Run #1 and #2; further condensation was observed to occur on previously sulfur condensed surfaces in the affected dry area.

This example established the basic fact that a completely wetted surface is free from solid sulfur condensation and buildup, while a dry surface has sulfur buildup.

EXAMPLE #2

Simultaneous Condensation of Sulfur and Water Vapors

In Run #5, similar to #3 in the above experimental set up, steam was injected into the hot $N_2$ stream prior to its passing through the molten sulfur bath and the contactor. The gas, with about 40% steam, was cooled to below its water dewpoint by the water spray at 60° F. The outlet gas temperature was measured at about 79° F. In contrast to Run #3 ($N_2$/S vapor), the simultaneous condensation of sulfur and water vapors kept the non-uniformly wetted surfaces of the divergent venturi section and the gas/liquid disengager reservoir virtually free from sulfur deposition. Unlike the $N_2/S_v$ runs, during the course of Run #5, condensed sulfur particles were observed not to have any tendency to stick to the contactor walls, but were constantly washed away by the liquid stream; the solid sulfur appeared to be of a snowflake type.

The example established the fact that simultaneous sulfur and water vapor condensation (below its water dewpoint) from the gas is essential to preventing solid sulfur sticking to contactor surface in addition to the flowing water film created by the water spray.

EXAMPLE #3

Wettable versus Non-Wettable Surfaces

In Run #8, similar to Run #5, a teflon coupon was inserted into the divergent section of the glass venturi wall. It was observed, after 135 minutes, that sulfur was deposited on the teflon surface preferentially over the glass surface. A significant sulfur layer was built up on the teflon surface downstream of throat and at the bottom of the divergent section, while the glass surface at a similar location remained relatively clean.

This example clearly established the fact that a water non-wettable surface, such as teflon, is easily subject to sulfur deposit and buildup, while water wettable surfaces, such as glass and common metals, are not.

EXAMPLE #4

Constant Diameter Dip-Tube Bubbling Contactor Versus Divergent Venturi Contactor In contrast to the venturi contactor used in the experiments in Examples #1, #2, and #3, experiments were run in a different contactor. This contactor as in FIG. 2a had a constant diameter dip tube extended from the throat into the liquid with a submergence level of 3-4". This design eliminates any dry surfaces of the previous venturi contactor design in the areas of the divergent section and the gas/liquid disengaging reservoir.

The surface of the constant diameter dip tube is easily covered by a falling liquid film, and the liquid submergence completely eliminates the contact of the gas and contactor wall and further cools, condenses the water vapor, and captures any sulfur particles from the gas. In Run #9, a $N_2/S_v$ water vapor mixture, similar to Run #8, was passed through the new contactor. It was observed that after 5.5 hours of operation, all surfaces were essentially free of sulfur deposit, and the gas leaving the contactor was free of any entrained sulfur particles. The sulfur water suspension in the flask appeared to be a milky white, fine suspension and yellow particulate agglomerates were observed in the liquid draw-off tubing. The pH was about 7-8.

This example demonstrated that a constant diameter dip tube bubbling contactor prolonged the operation, since it was free of any dry surface susceptible to sulfur deposition and buildup.

EXAMPLE #5

Effects of $H_2S$ and $SO_2$ on Water/Sulfur Condensation in the Dip Tube Contactor To contrast Run #4 in which $N_2/S_v$/water vapor mixture was tested in the dip tube contactor, simulated Claus gas feeds containing $H_2S$ and $SO_2$ and other gases were used in a similar experimental setup having a constant diameter dip tube. The feed compositions for both air-based and $O_2$-based Claus process (first sulfur condenser overhead gas) are shown in Table 1. The operating conditions are shown in Table 2.

TABLE 1

| | Feed Compositions | |
|---|---|---|
| | Air-Based | $O_2$-Based |
| $N_2$ | 62.4 | — |
| $CO_2$ | — | 44.2 |
| Steam | 27.9 | 40.9 |
| $H_2S$ | 6.4 | 9.9 |
| $SO_2$ | 3.2 | 4.9 |
| $S_x$ (vapor) | 0.1 | 0.1 |
| | 100.0 | 100.0 |

Notes:
Feed gas inlet conditions to dip-tube condenser: 330-370° F., 16-18.5 psia.
Feed gas saturated with sulfur vapor, by bubbling entire feed stream into a molten sulfur bath maintained at 350° F. ± 10° F.

TABLE 2

| | Run Parameters | | |
|---|---|---|---|
| Run No. | 001-ARC | 002-ARC | 003-ARC |
| Feed Gas | Air-Based (No $S_x$ Vapor) | Air-Based (with $S_x$ Vapor) | $O_2$-Based (with $S_x$ Vapor) |
| Dip-Tube I.D.* | ⅜" | ⅜" | 1" |
| Selected gas flowrate, cfm | 5.0 | 5.0 | 7.5 |
| Gas flowrate range tested, cfm | — | 3.0-6.0 | 5.0-9.5 |
| Dip-Tube Gas Velocity, ft/sec | 39.1 | 23.5-47.0 | 15.3-29.0 |
| L/G, gal/1000 acf. | 144 | 120-240 | 76-144 |
| Steam in feed gas (vol %) | 28 | 28 | 28 |
| Run time, mins | 110 | 235 | 190 |

*Note that convergent section throat i.d. for ⅜" dip-tube is ¼", and for 1" dip-tube is ⅞" (due to thickness of glass walls). Hence, superficial throat gas velocity is slightly higher than dip-tube gas velocity shown.

In Run #001-ARC, a Claus gas containing 6.4% $H_2S$ and 3.2% $SO_2$ but no $S_v$ was tested. The result showed that when gas was cooled from 350° F. to 80° F., the contact surface was free of any sulfur deposit and buildup. However, a white, milky colloidal mixture of high opacity was observed in the flask liquid. The pH was 1.8. The particle sizes were in the range of 1 to 38 μm with a mean of about 17 μm. No big agglomerates were observed.

In Run #002-ARC, the same gas mixture as in Run #001-ARC, but with 0.1% sulfur vapor, was tested. As before, the formed sulfur particles did not adhere to any surfaces of the contactor. The pH was about 1.8-2.5, and mean particle size was about 66 μm. Even with sulfur vapor condensed out with water, no large size agglomerates were observed in the presence of $H_2S$ and $SO_2$. Large mm size, hydrophobic agglomerates would appear immediately when $H_2S$ and $SO_2$ were switched off. The drastic change in particle size caused by their presence in the feed gas was verified by repeating this sequence thrice. This experiment suggests a complex sulfur chemistry involving reaction (1) to (8), indicated before, was operative. These liquid Claus reactions producing various ionic species such as polythionic acids tend to adhere to elemental sulfur nuclei and stabilize them to form stable milky suspensions in water. This would prevent sulfur particles from agglomeration into larger particles. These small size particles were observed to be less sticky than the agglomerates.

In Run #003-ARC, $O_2$-based Claus gas with 10% $H_2S$, 5% $SO_2$, and 41% water vapor was tested in a larger diameter dip tube contactor. Similar results as in Run #002-ARC were obtained, i.e. no sulfur buildup on surfaces and a milky white, less-sticky sulfur suspension was formed.

From this example, it was established that simultaneous condensation of water and sulfur vapors from a Claus gas containing $H_2S$ and $SO_2$ in a dip tube contactor can be achieved without sulfur buildup on the surface and a stable, milky sulfur suspension is formed.

EXAMPLE #6

Effects of Heating and $H_2S$ Sparging into Aqueous Sulfur Suspension

The aqueous sulfur suspension as obtained in Example #5 was observed to be very stable at ordinary ambient temperatures (50°-80° F.). Gravitational settling occurred only after 2-3 days, with complete settling in approximately one week. In an attempt to break the suspension, application of heat with gentle stirring and nitrogen gas sparging into the suspension were tested. No change was observed with temperature increase until a temperature of about 178°-180° F. was reached. Rapid onset of agglomeration was observed and most agglomerates settled within 3-5 minutes, leaving a clear water mixture.

In another experiment, a stable sulfur suspension was heated to about 167° F. Sulfur agglomerates were observed to settle out in about 120 minutes.

In a third experiment, a stable suspension was sparged with steam for about 45 minutes. Sulfur coagulated into large clumps about ½" in size and settled out rapidly.

In another experiment, a stable sulfur/water suspension was prepared by sparging stoichiometric amounts of $H_2S/SO_2$ (2) into water. Upon sparging pure $H_2S$ gas with stirring, sulfur coagulated and precipitated out readily. Sparging a gas with near pure $H_2S$ with 0.18% $SO_2$ into the suspension resulted in sluggish precipitates.

In yet another experiment, a Claus gas with a composition similar to the air-based feed in Table 1 was cooled from about 325° F. to 130° F. by contacting it with cooling water in the contactor similar to FIG. 2a. A sample of resulting aqueous sulfur suspension was withdrawn and processed in the batch operation described below.

The suspension, about 400 cc, was charged to a bench top sparge vessel, which was heated externally to maintain a temperature of about 167° F. A sparge gas containing about 85% $H_2S$ and 15% $N_2$ was bubbled through the suspension at different sparge rates (50 cc/min to 400 cc/min). The gas composition of both inlet and outlet was monitored by a gas chromatography to determine the actual $H_2S$ consumption. The results are shown in the following table, Table 3.

TABLE 3

Sulfur/Water Separation Test Results With $H_2S$ Sparging at 167° F., 400 cc Suspension

| Run No. | $H_2S$ Sparge Rate cc/min | Time in Minutes For | | | Total $H_2S$ Consumed in moles |
|---|---|---|---|---|---|
| | | Color Change | 1st Floc | Settling | Clear | |
| A | 50 | 8 | 19 | 31 | 48 | 71 |
| B | 100 | 8 | 16 | 25 | 43 | 88 |
| C | 100 | 11 | 26 | — | 58 | 126 |
| D | 100 | 19 | 128 | — | 154 | 136 |
| E | 400 | 8 | 15 | 25 | 36 | 112 |

NOTE:
*Run #C had a shelf life of 3-4 hours before sparging.
*Run #D had a sulfur wt % of about 7.4%.
*Run #B had about 1 wt % sulfur and 1 hr shelf life.

It was observed, within the experimental variation, that sulfur/water separation could be effected by sparging $H_2S$ gas from 30 minutes to about 2.5 hours. The optimal result appears to be at high sparging rate, for example, at 400 cc/min for 36 minutes. The amount of $H_2S$ consumed was estimated to be about twice of dissolved $SO_2$ in various ionic forms.

This example established the fact that stable sulfur suspension formed from condensing water and sulfur vapor from a Claus gas can be effectively destabilized and flocculated by a combination of heating to about 170° F. and above and/or by sparging a relatively pure $H_2S$ gas. This novel technique solves the long-standing difficulty confronting the industry for increasing sulfur conversion and recovery in a Claus process.

EXAMPLE #7

Further Sulfur Conversion During Water/Sulfur Vapor Condensation

In one experiment, about 6% $H_2S$ and 3% $SO_2$ in 2-to-1 stoichiometric ratio was bubbled into water at about 140° F. $H_2S$ conversion was measured to be in the range of 75 to 80%. Milky sulfur suspension was formed.

In another experiment using the dip tube contactor in Example #5, a Claus gas at 360° F. containing 7.6% $H_2S$, 3.6% $SO_2$, 0.4% $S_v$, with balance being $N_2$ and water vapor was rested. The $H_2S$ conversion into sulfur was measured to be greater than about 60%. The water temperature was about 100° F. Stable milky sulfur suspension was formed. This example shows absorbed $H_2S$ and $SO_2$ to form sulfur while a Claus gas is dehydrated by the practice of this invention.

As the examples clearly show, the apparatus and process steps of the present invention provide a unique technique for recovering solid sulfur simultaneous with the removal of water of reaction as condensate from a Claus process gas containing both of those components wherein a completely water wetted dip tube and the simultaneous sparging of hydrogen sulfide and heating allow for the efficient recovery of water and solid sulfur and the separation of those components for removal or recycle without sulfur plugging or complex separatory apparatus and procedures.

The present invention has been set forth with regard to a specific preferred embodiment. However, the full scope of the present invention should be ascertained from the claims which follow.

We claim:

1. A process for recovering solid sulfur and water of reaction from a Claus process gas at pressures at or below approximately 30 psia wherein the solidified sulfur does not adhere to process equipment surfaces, comprising the steps of:
    (a) introducing the Claus process gas, containing at least water, sulfur, hydrogen sulfide and sulfur dioxide, into a gas-liquid contactor having an inlet gas-liquid contact zone wherein the surface is wetted by a falling water film and a gas-liquid disengaging zone;
    (b) cooling the Claus reaction effluent below the freezing point of sulfur of approximately 248° F. and below the water condensing temperature by introducing cooling water into the said inlet zone such that a spray of water directly contacts the Claus gas and said water forms a falling water film on all interior surfaces of said inlet gas-liquid contact zone to preclude adherence of solid sulfur to such surfaces;
    (c) separating thus formed aqueous solid sulfur suspension from the dehydrated, sulfur-free Claus effluent in the bottom of said contactor in said gas-liquid disengaging zone;
    (d) removing the said Claus process gas from said gas-liquid contactor; and
    (e) removing the said aqueous sulfur suspension from said gas-liquid contactor.

2. A process for recovering solid sulfur and water of reaction, separately respectively, from a Claus process gas at pressures at or below approximately 30 psia wherein the solidified sulfur does not adhere to process equipment surfaces, comprising the steps of:

(a) introducing the Claus process gas, containing at least water, sulfur, hydrogen sulfide and sulfur dioxide, into a gas-liquid contactor having an inlet gas-liquid contact zone wherein the surface is wetted by a falling water film and a gas-liquid disengaging zone;

(b) cooling the Claus reaction effluent below the freezing point of sulfur of approximately 248° F. and below the water condensing temperature by introducing cooling water into the said inlet zone such that a spray of water directly contacts the Claus gas and said water forms a falling water film on all interior surfaces of said inlet gas-liquid contact zone to preclude adherence of solid sulfur to such surfaces;

(c) separating thus formed aqueous solid sulfur suspension from the dehydrated, sulfur-free Claus effluent in the bottom of said contactor in said gas-liquid disengaging zone;

(d) removing the said Claus process gas from said gas-liquid contactor;

(e) removing the said aqueous sulfur suspension from said gas-liquid contactor;

(f) sparging the said aqueous sulfur suspension with a stream of hydrogen sulfide-containing gas substantially free of $SO_2$ and $O_2$ in an inlet zone of a separator;

(g) settling solid sulfur from water in a calming zone of said separator to separate the solid sulfur from the water;

(h) removing solid sulfur from said separator; and (i) removing net water from the said separator and cooling the remaining water and returning the said cooled water to the inlet gas-liquid contact zone of the said gas-liquid contactor.

3. The process of claim 2 wherein the Claus process gas enters the said gas-liquid contactor in the range of 248° F. to 450° F.

4. The process of claim 2 wherein the Claus process gas is cooled to a temperature in the range of 90° F. to 170° F.

5. The process of claim 2 wherein the Claus process gas is introduced into the contactor concurrently downward with the water spray.

6. The process of claim 2 wherein the Claus process gas is introduced and contacted countercurrently upward with the water spray in said inlet gas-liquid contact zone of said contactor.

7. The process of claim 2 wherein gas-liquid of the inlet gas-liquid contact zone discharges at a submerged point in the gas-liquid disengaging zone.

8. The process of claim 2 wherein additional cooling of step (b) is provided by external cooling source.

9. The process of claim 2 wherein the aqueous sulfur suspension temperature in the separator is maintained at a temperature of 120°–250° F.

10. The process of claim 9 wherein said aqueous sulfur suspension temperature is maintained by an external heating source.

11. The process of claim 2 wherein the $H_2S$ sparging gas introduced in the inlet zone of the said separator is derived from a portion of an acid gas feed to a Claus process.

12. The process of claim 2 wherein the net water removed from the separator is filtered to remove solids.

13. The process of claim 2 wherein the remaining water removed from the separator is filtered to remove solids.

14. The process of claim 2 wherein the $H_2S$ sparged inlet zone is physically separated from the calming zone.

* * * * *